Nov. 28, 1967     K. G. SODER     3,354,642

TURBOMAGNETIC PUMP

Filed May 18, 1965

INVENTOR.
Karl G. Soder

BY

Paul Fitzpatrick
ATTORNEY

United States Patent Office 3,354,642
Patented Nov. 28, 1967

3,354,642
TURBOMAGNETIC PUMP
Karl G. Soder, Indianapolis, Ind., assignor to General Motors Corporation, Detroit, Mich., a corporation of Delaware
Filed May 18, 1965, Ser. No. 456,756
5 Claims. (Cl. 60—59)

ABSTRACT OF THE DISCLOSURE

A pump for pumping hot, electrically conductive fluids in which the fluid is pumped by a rotating magnet which is driven by a turbine. The turbine is driven by gases which are compressed by a compressor driven from the turbine and heated by the hot fluid being pumped.

---

My invention relate to a turbomagnetic pump by which I mean a device for pumping an electrically conducting liquid such as a liquid metal by bringing the liquid in proximity to a rotating magnetic field in which the rotating magnetic field is produced by a turbine driven magnet. Such devices find use in connection with power plants which utilize an electrically conducting liquid as an energy transfer medium from a heat source to a device for producing useful mechanical work. In such applications, the liquid enters the heat source at a low temperature and pressure and leaves the heat source at a high temperature and pressure. In closed systems, that is, those where the energy transfer liquid flows through a closed loop, a pump must be provided to return the liquid to the heat source to circulate the liquid in the closed loop. When the working medium is an electrically conducting liquid such as a liquid metal which must be pumped back to the heater, a magnetic type of pump is highly feasible. A magnetic type of pump is one which utilizes a moving magnetic field causing a liquid metal to be accelerated or pumped in the direction of the movement of the magnetic field as it comes in proximity to the field. Heretofore magnetic pumps have found successful use and have been driven totally by an external power source.

My invention is directed to providing a magnetic pump for pumping hot electrically conducting liquids which derives some of the power required to drive the pump from the liquid being pumped.

Another object is to provide a magnetic pump-gas turbine combination for pumping hot electrically conducting liquids which transfers heat from the liquid being pumped to the gas turbine to supply at least a portion of the power required to drive the turbine and pump.

Another object is to provide a magnetic pump which is driven by a gas turbine in which the energy added to the working fluid expanded through the gas turbine is derived from the liquid being pumped and is thereby a self-sustaining combination.

These and other objects will become more readily apparent from consideration of the following specification relating to the annexed drawing in which.

Figure 1:
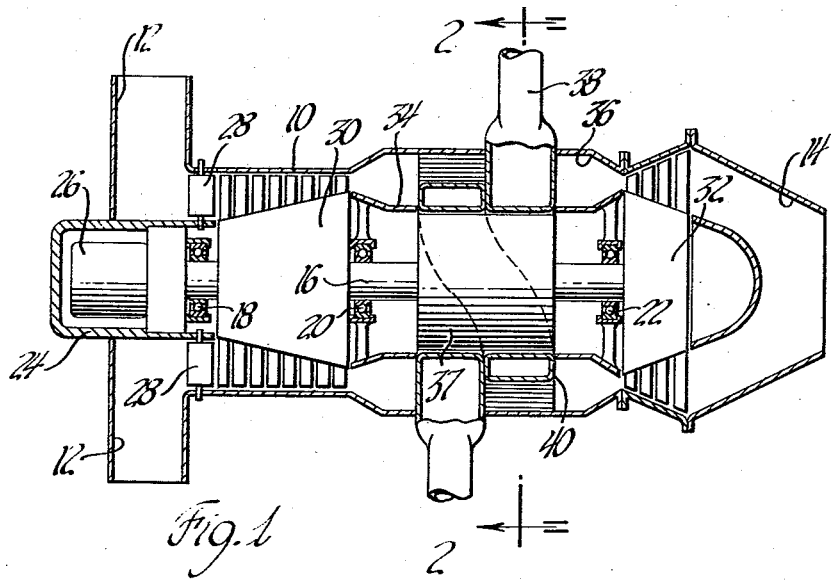
FIGURE 1 is a sectional view of a turbomagnetic pump in accordance with my invention taken on a plane containing the longitudinal axis of the turbine.
Figure 2:
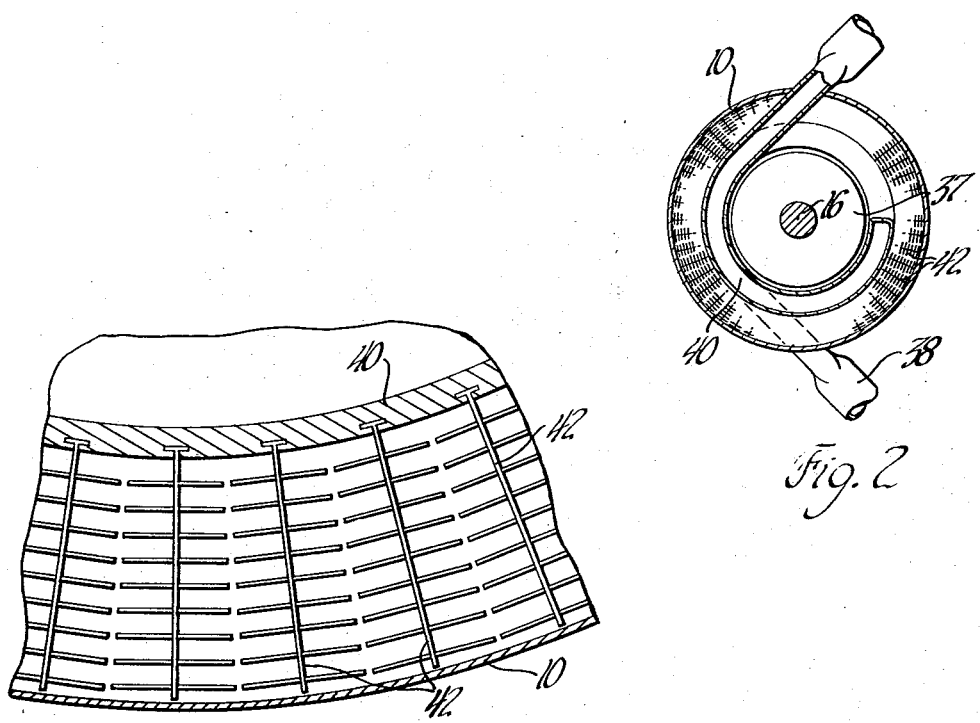
FIGURE 2 is a cross section taken substantially along the line 2—2 of FIGURE 1 and looking in the direction of the arrows.
Figure 3:
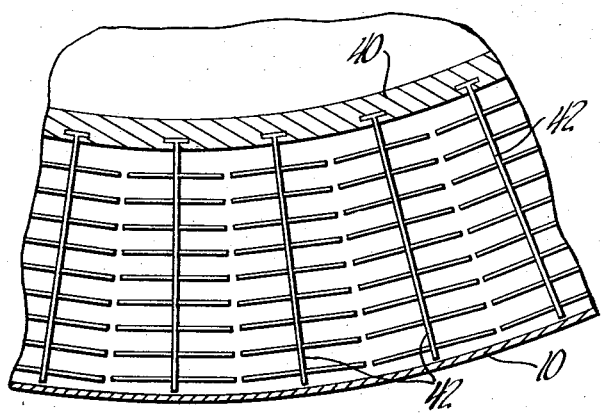
FIGURE 3 is an enlarged view of a portion of FIGURE 2 showing the detail of the heat exchange fins.

More specifically, FIGURE 1 depicts a turbomagnetic pump comprising a casing 10 having an inlet 12 and an outlet 14. A shaft 16 is rotatably mounted on the axis of the casing 10 by ball bearings 18, 20 and 22. A cup-shaped housing 24 extends into the inlet 12 and has an electric motor 26 mounted therein with its output shaft connected to the forward end of the shaft 16. A number of inlet vanes 28 have their opposite ends journaled in the housing 24 and the casing 10 respectively for rotation about radial axes in a plane adjacent the upstream end of a compressor 30. The compressor 30 is mounted on the forward portion of the shaft 16 and is driven by a turbine 32 mounted on the opposite end of the shaft 16 which is adjacent the exit or exhaust nozzle 14. A magnet 37 is mounted on the shaft 16 between the compressor 30 and the turbine 32. An annular member 34 is mounted concentrically within the casing 10 between the compressor 30 and the turbine 32 to form an annular passage 36. The passage 36 serves as a flow path from the compressor 30 to the turbine 32 and also as a heat supply chamber. A conduit 38 extends transversely through the passage 36 with its mid portion 40 coiled about the inner wall 34 of the passage 36. The coiled portion 40 is in proximity to the magnet 37 and is substantially axially coextensive with the magnet 37. The coiled portion 40 may be provided with a number of branched fins 42 radially extending into the heat supply chamber 36 (shown in detail in FIGURE 3).

In operation, the electric motor 26 is energized to start the compressor 30, magnet 37, and turbine 32 rotating. This causes air to be drawn in through the inlet 12, compressed by the compressor 30, and delivered to the annular heat supply chamber 36. In the meantime, the rotating magnet has caused the flow of a hot electrically conducting liquid such as a liquid metal in the conduit 38 from the lower end around the coiled portion 40 and out the upper end. The heat from the liquid metal is transferred through the conduit walls and fins 42 to the compressed air in the heat supply chamber 36. The heated air then expands through the turbine 32, imparting energy thereto. The energy derived from the airstream imparts rotational movement to the turbine 32 which drives compressor 30 and the magnet 37 and the process is continued. Thus the liquid being pumped supplies some of the energy required to pump the same. When the system has attained equilibrium so that the heat transferred from the liquid metal maintains the air flowing through the chamber 36 at approximately 1000° F., the system will be self-sustained, that is, a sufficient amount of heat will be transferred from the liquid metal to the working fluid for the turbine to cause the turbine to drive its compressor and the magnet 37. In addition, the speed of the turbine may be controlled by varying the mass air flow through the compressor 30 by adjusting the angle of the rotatably mounted inlet vanes 28.

Thus, it can be seen that I have invented a turbomagnetic pump for pumping hot electrically conducting liquids in which at least a portion of the energy for driving the pump is supplied by the hot liquid being pumped.

While I have discussed the utility of my invention in connection with a closed liquid metal loop for a power plant, it obviously is useful in any system in which a sufficiently hot electrically conducting liquid requires pumping.

Obviously many modifications and variations of the present invention are possible in the light of the above teachings. It is, therefore, to be understood that within the scope of the appended claims, the invention may be practiced otherwise than as specifically described.

I claim:
1. A turbomagnetic pump for pumping hot electrically conducting liquids comprising:
   a casing having an inlet and an outlet,
   a compressor rotatably mounted in said casing adjacent said inlet,
   a turbine rotatably mounted coaxially with said compressor in said casing adjacent said outlet, an annular passage extending between said compressor and said turbine to establish a flow path for a working fluid from said inlet to said outlet, a drive shaft spaced radially inwardly from said annular passage coupling said turbine to said compressor, a magnet mounted on said drive shaft between said compressor and said turbine, a conduit extending transversely through said passage in proximity to said magnet for pumping hot electrically conducting liquids, and heat exchange fins on said conduit disposed in said passage whereby heat is transferred from a hot liquid in said conduit to said working fluid in said conduit to cause the fluid to expand through said turbine and drive said compressor and magnet to compress said fluid and to magnetically pump said liquid.

2. A turbomagnetic pump for pumping hot electrically conducting liquids comprising:

a casing having an inlet and an outlet, a compressor rotatably mounted in said casing adjacent said inlet, a turbine rotatably mounted coaxially with said compressor in said casing adjacent said outlet, an annular passage extending between said compressor and said turbine to establish a flow path for a working fluid from said inlet to said outlet, a drive shaft spaced radially inwardly from said annular passage coupling said turbine to said compressor, a magnet mounted on said drive shaft between said compressor and said turbine, a conduit extending transversely through said annular passage for pumping hot electrically conducting liquids, a portion of said conduit being coiled around the inner wall of said annular passage, said coiled portion being substantially axially coextensive with said magnet and having heat exchange fins extending therefrom into said passage whereby heat is transferred from a hot liquid metal in said conduit to a compressed fluid in said conduit to expand the fluid through said turbine to drive said compressor and magnet to compress said fluid and to magnetically pump said liquid.

3. The turbomagnetic pump as described in claim 2 in which said inlet is provided with a plurality of rotatably mounted vanes to vary the mass air flow through the compressor to control the speed of the turbine and pump.

4. A turbomagnetic pump for pumping hot electrically conducting liquids comprising:

a casing having an inlet and an outlet, a compressor, heat supply means, and turbine rotatably mounted coaxially in said casing between said inlet and said outlet, drive means between said turbine and said compressor, a magnet mounted on said drive means between said compressor and said turbine, a conduit extending transversely through said heat supply means in proximity to said magnet for pumping hot electrically conducting liquids, and heat exchange means to transfer heat from said conduit to said heat supply means whereby said pump is driven by heat supplied from the liquid being pumped.

5. A turbomagnetic pump for pumping hot electrically conducting liquids comprising:

a casing having an inlet and an outlet, a magnet, heat supply means and turbine rotatably mounted coaxially in said casing between said inlet and said outlet, drive means between said turbine and said magnet, a conduit extending transversely through said heat supply means in proximity to said magnet for pumping hot electrically conducting liquids, and heat exchange means to transfer heat from said conduit to said heat supply means whereby said pump is driven by heat supplied from the liquid being pumped.

References Cited

UNITED STATES PATENTS

| | | | |
|---|---|---|---|
| 898,346 | 9/1908 | DeFerranti | 60—203 |
| 2,870,608 | 1/1959 | Comyns-Carr | 60—59 |
| 2,915,973 | 12/1959 | Findlay | 103—1 |
| 2,978,985 | 4/1961 | Lindenblad | 103—1 |
| 3,213,001 | 10/1965 | Schmidt | 60—59 |

DONLEY J. STOCKING, *Primary Examiner.*

WILLIAM L. FREEH, *Assistant Examiner.*